United States Patent [19]

Weir

[11] 4,380,089

[45] Apr. 12, 1983

[54] BATTERY-POWERED TRANSMITTER INCLUDING CURRENT CONTROL CIRCUIT

[75] Inventor: Colin B. Weir, Franklin, Mass.

[73] Assignee: GTE Products Corporation, Stamford, Conn.

[21] Appl. No.: 159,523

[22] Filed: Jun. 16, 1980

[51] Int. Cl.³ .......................... H04B 1/04; H03G 3/20
[52] U.S. Cl. .................................. 455/127; 455/117; 330/207 P
[58] Field of Search ............ 455/127, 117, 115; 330/207 P, 285, 289, 297, 298, 127, 136, 199

[56] References Cited

U.S. PATENT DOCUMENTS

| | | | |
|---|---|---|---|
| 3,449,680 | 6/1969 | Schlib | 455/117 |
| 3,641,451 | 2/1972 | Hollingsworth | 455/61 |
| 3,644,832 | 2/1972 | Sherman | 455/127 |
| 3,852,669 | 12/1974 | Bowman | 455/117 |
| 4,114,108 | 9/1978 | Faulkenberry | 455/127 |
| 4,158,180 | 6/1979 | Challen | 455/117 |

Primary Examiner—Tommy P. Chin
Attorney, Agent, or Firm—Peter Xiarhos

[57] ABSTRACT

A portable, battery powered transmitter including a current control circuit for controlling the output power of the transmitter over a wide range of variations in battery voltage, rf input power and frequency, and ambient temperature. The transmitter includes an amplifier operative to receive a voltage from the current control circuit and to draw load current from the current control circuit. The load current drawn by the amplifier is limited by the current control circuit to a predetermined maximum value thereby to prolong the mission life of the battery source powering the transmitter.

14 Claims, 4 Drawing Figures

BATTERY-POWERED TRANSMITTER INCLUDING CURRENT CONTROL CIRCUIT

The invention herein described was made in the course of a contract with the Department of the Navy.

BACKGROUND OF THE INVENTION

The present invention relates to a transmitter and, more particularly, to a portable, battery-powered transmitter including a current control circuit for controlling the output power of the transmitter over a wide range of variations in battery voltage, rf input power and frequency, and ambient temperature.

There are many applications in which it is desirable for a user of a portable, battery-operated, low-power transmitter to initiate a rf transmission, for example, in the form of a rf signal, by which some action can be controlled. In such applications, it is generally a requirement that the output of the transmitter be established and maintained at a sufficiently high, detectable level over a wide range of variations in battery voltage, rf input power and frequency, and ambient temperature. This control of the output power is especially important in the case of the reduction or decline over a period of time of the value of voltage of the battery due to normal discharge or current drain. In this situation, it is desirable that the discharge or drain of the battery be minimized as much as possible, and over as long a period of time as possible, so as to guarantee or insure a sufficiently long battery mission life.

Apparatus which has been proposed heretofore for achieving the above objectives and requirements includes reflectometers and peak rf detectors. In the case of a reflectometer, this device is coupled by suitable circuitry to the output of the transmitter and periodically samples the level of the output power of the transmitter. The sampled power values are converted to voltages and compared in value with a reference voltage. The results of the comparison operations are used to maintain the output power of the transmitter at a reasonable, constant value. This control of the output power of the transmitter is achieved irrespective of the values of battery voltage or current. The abovedescribed reflectometer, while providing precise control, is a passive device requiring considerable and costly circuitry, including coils, strip line assemblies, capacitors, etc., and further requires a precise voltage reference and complex temperature compensation and calibration. In addition, the reflectometer, by virtue of being coupled to the output circuit of the transmitter, adds insertions loss to the circuit thereby dissipating the output power of the transmitter and placing an additional power gain burden on the transmitter.

A peak detector as mentioned hereinabove, when utilized to control the output power of a transmitter, is coupled to the output circuit of the transmitter and samples peak power. However, this type of detector is useful only for narrowband applications because of possible impedance variations, for example, in the case of unexpected antenna-related malfunctions (e.g., high VSWR conditions). In addition, this type of detector, like the aforedescribed reflectometer, requires coupling circuitry for coupling the device to the output circuit of the transmitter, thereby adding to the overall cost of the transmitter.

BRIEF SUMMARY OF THE INVENTION

In accordance with the present invention, a transmitter is provided which avoids the disadvantages and shortcomings of prior art apparatus as described hereinabove. The transmitter in accordance with the invention is powered by a dc voltage of a battery source and is arranged to amplify a rf signal over a range of variations in the value of the voltage of the battery source. The transmitter of the invention comprises an amplifier means and a control circuit means. The amplifier means is arranged to receive a rf signal and has a control input. The control circuit means is coupled to the battery source and to the control input of the amplifier means and is powered by the battery source. The control circuit means operates to produce a control voltage at the control input of the amplifier means having a value related to the value of the voltage of the battery source and a related load current limited to a predetermined maximum value. The amplifier means operates in response to the control voltage at its control input to amplify the rf signal in accordance with the value of the control voltage and to draw load current from the control circuit means having a value related to the value of the control voltage but not to exceed the predetermined maximum value. The limitation of the amount of the load current drawn by the amplifier means results in a conservation of the battery source, thereby prolonging the mission life of the battery source.

BRIEF DESCRIPTION OF THE DRAWING

Various objects, features and advantages of transmitters in accordance with the present invention will be apparent from a detailed discussion taken in conjunction with the accompanying drawing in which.

DETAILED DESCRIPTION OF THE INVENTION

Figure 1:
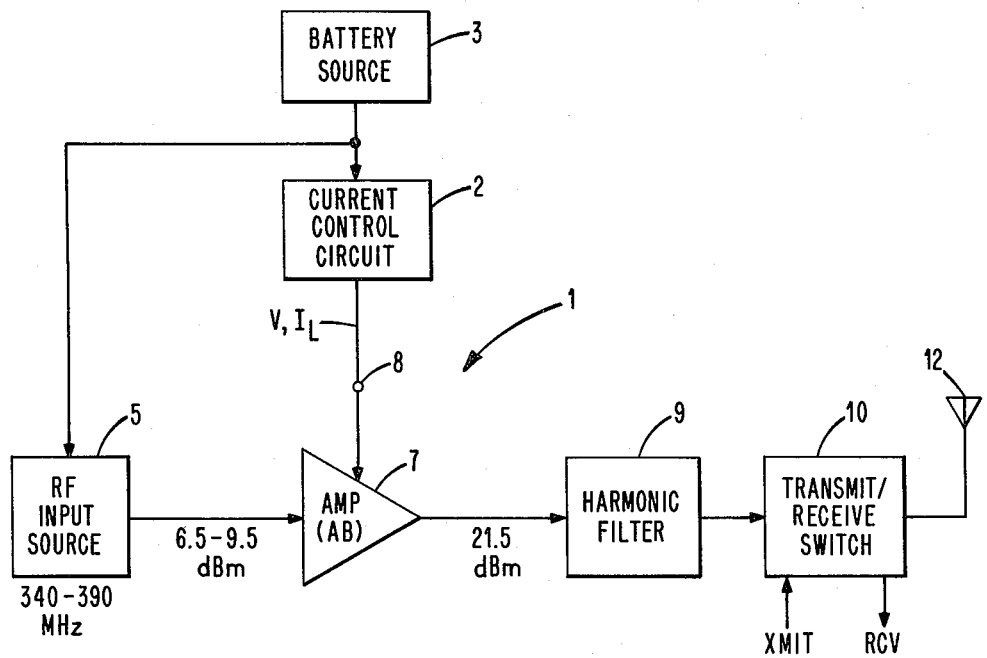
FIG. 1 is a schematic block diagram of a portable, battery-operated low-power FM transmitter including a current control circuit in accordance with a first embodiment of the invention.

Referring now to FIG. 1, there is shown an FM transmitter 1 including a current control circuit 2 in accordance with a first embodiment of the invention. The transmitter 1 is a low-power device, for example, 100-300 mw., and is arranged to be used in a portable fashion by the operator of the transmitter 1. The transmitter 1 is powered by a battery source 3 which, in a typical implementation, comprises several nickel-cadmium batteries interconnected to provide a nominal voltage of about 9.5 volts. A typical operating voltage range for the battery source 3 is 8 to 11 volts, and a typical ampere-hour rating for the battery source 3 is 0.45 ampere-hours.

Input power to be transmitted by the transmitter 1 originates with a rf input source 5. The rf input source 5, which may be suitably implemented by a rf synthesizer, is powered by the battery source 3 and operates to produce a rf signal. This signal represents a digitized-speech FSK-modulated rf carrier selected from within a varying rf bandwidth of 340-390 Mhz, and has a power level within a range of +6.5 to +9.5 dBm. The particular power level at any given instant is dictated primarily by the value of voltage of the battery source 3 which powers the input source 5 and, to a lesser degree, the carrier frequency selected for use and the ambient temperature.

The output signal produced by the rf input source 5 is applied to the input of an amplifier 7. The amplifier 7 is a standard Class AB UHF amplifier and has a control input 8 coupled to the aforementioned current control circuit 2 for receiving a voltage from the control circuit 2. The amplifier 7 draws current $I_L$ from the current control circuit 2 (e.g., in the collector circuit of a transistor employed in the amplifier 7), and operates to amplify the rf signal received at its input in accordance with the value of the voltage at its control input 8 and to apply the amplified signal to an output thereof. As will be described in detail hereinafter, the current control circuit 2 permits the amplifier 7 to draw current therefrom as needed but not to exceed a specified maximum value, for example, 45 mA. This limit allows amplification by the amplifier 7 to take place while at the same time conserving the battery source 3 and, thereby, prolonging its mission life. By way of specific example, when the rf signal received by the amplifier 7 is at a high power level, for example, +9.5 dBm, and/or the voltage of the battery source 3 is at a high value, for example, 11 volts dc, the amplifier 7 is permitted to draw the maximum amount of current from the current control circuit 2, that is, 45 mA, but no more, thereby conserving the battery source 3. When the rf signal is below +9.5 dBm and/or the voltage of the battery source 3 is below 11 volts dc, the amplifier 7 is permitted to draw up to 45 mA. from the current control circuit 2 but not more than 45 mA. Similarly, this maximum of 45 mA. will not be exceeded for variations in ambient temperature accompanying the above conditions. A typical range of temperatures over which the transmitter 1 may be used is −30° C. to +72° C.

The amplified output signal produced by the amplifier 7 as discussed hereinabove is applied to a standard harmonic filter 9. The harmonic filter 9 operates to suppress harmonics of the fundamental carrier frequency of the amplified signal produced by the amplifier 7. The output signal of the harmonic filter 9 is applied to a transmit/receive switch 10. The transmit/receive switch 10 is a standard component and has transmit and receive modes of operation as determined by the user or operator of the transmitter 1. More particularly, when the operator of the transmitter 1 wishes to transmit rf signals to a desired location within the range of the transmitter, the operator sets the transmit/receive switch 10 to its transmit mode whereby the rf signals are coupled through the switch to an antenna 12 and transmitted to the desired location; when the operator wishes or expects to receive rf signals from another location, specifically, by way of the antenna 12, the operator sets the switch 10 to its receive mode whereby rf signals received by the antenna 12 can be coupled through the switch 10 to suitable receiver equipment (not shown).

Figure 2:
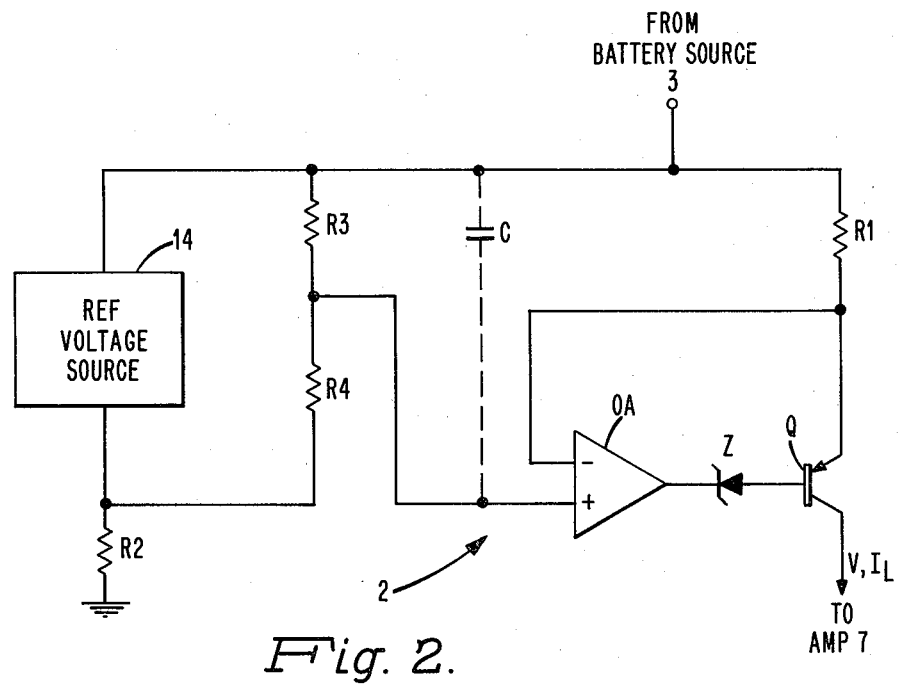
FIG. 2 is a schematic circuit diagram of the current control circuit employed in the transmitter of FIG. 1.

The current control circuit 2 as discussed hereinabove is shown in FIG. 2. The control circuit 2 as shown in FIG. 2 includes a pnp control transistor Q. The transistor Q is coupled to the battery source 3 by way of a resistance R1 in its emitter circuit and to the control input 8 of the amplifier 7 by way of its collector.

A series arrangement of a reference voltage source 14 and a current-limiting resistance R2 is connected between the juncture of the resistance R1 and the battery source 3 and ground potential. The juncture of the reference voltage source 14 and the resistance R2 is connected to a series arrangement of voltage-divider resistances R3 and R4 which are connected across the reference voltage source 14. The juncture of the resistances R3 and R4 is connected directly to a non-inverting (+) input of an operational amplifier OA, and the juncture of the resistance R1 and the emitter of the transistor Q is connected directly to an inverting (−) input of the operational amplifier OA. The output of the operational amplifier OA is connected to the cathode of a Zener diode Z the anode of which is connected to the base of the transistor Q.

The reference voltage source 14 as described hereinabove produces a reference dc voltage of a fixed value, for example, 1.3 volts. This voltage is modified, that is, reduced, by the resistances R3 and R4 to establish the non-inverting input of the operational amplifier OA at a value of voltage related to the value of the voltage of the battery source 3. More particularly, the voltage at the non-inverting input of the amplifier OA at any given instant is established to be equal to the then existing value of the voltage of the battery source 3 less the value of the reference voltage of the reference voltage source 14 as modified by the voltage-divider resistances R3 and R4 connected across the reference voltage source 14. The resistances R3 and R4, by virtue of controlling the voltage at the non-inverting input of the amplifier OA, also set the current-limiting threshold for the control circuit 2, for example, to a maximum value of load current $I_L$ of 45 mA. The use of a small value of reference voltage as discussed above further enables the resistance R1 to be of small value, for example, 2.5 ohms, whereby voltage drops established across the resistance R1 during normal operation of the control circuit 2 have small values, for example, from 0.100 to 0.113 volts. The resistances R3 and R4 are also used to provide temperature compensation for the transmitter of the invention. More particularly, the resistances R3 and R4, which may be of a wire-wound or metal film type, may be selected to have specified temperature coefficients so that the voltage at the non-inverting input of the amplifier OA varies with temperature. As a result, battery current drain is reduced slightly both during hot and cold temperature operation, thereby extending the mission life of the battery source 3.

The reference voltage source 14 as described hereinabove can be suitably implemented by a reference voltage source as manufactured by the National Semiconductor Company and available to the trade under the designation LM113. The transistor Q may be of a type having a low saturation voltage, such as a type 2N2907A. The operational amplifier OA may be of a type LM101A as manufactured by the National Semiconductor Company and the Zener diode Z may be of a type IN750. Suitable values for the resistances R2, R3 and R4 are 10 Kilohms, 1 Kilohm, and 9.1 Kilohms, respectively.

In the operation of the control circuit 2 as described hereinabove, the transistor Q, by virtue of its connection with the battery source 3 and the operational amplifier OA, has its base at a sufficiently negative voltage relative to its emitter so as to be biased into its conducting state. In the conducting state of the transistor Q, a voltage V is established at the collector of the transistor Q and a load current $I_L$ is made available for use by the amplifier 7. Except for a small amount of current in the base circuit of the transistor Q, the current through the resistance R1 has the same value as the load current $I_L$. The resistance R1 thus effectively functions as a current-sensing element for sensing current drawn by the amplifier 7. As a result of the current flow through the resistance R1, a voltage indicative of the load current $I_L$ is developed thereacross which is coupled to the inverting input of the operational amplifier OA. The operational amplifier OA operates to compare the value of this voltage (across the resistance R1) with the value of the voltage as established by the reference voltage source 14 and the resistances R3 and R4 at the non-inverting input of the operational amplifier OA. The difference in values is amplified by the operational amplifier OA. As previously mentioned, the value of the voltage established by the reference voltage source 14 and the resistances R3 and R4 at the non-inverting input of the operational amplifier OA at any given instant is equal to the then existing value of voltage of the battery source 3 less the fixed value of the reference voltage source 14 (i.e., 1.3 volts) as modified by the resistances R3 and R4.

As a result of the comparison operation performed by the operational amplifier OA, an error voltage having a value directly proportional to the difference in the values of the compared voltages is produced at the output of the operational amplifier OA and coupled by way of the forward-biased Zener diode Z into the base of the transistor Q. The specific value of this error voltage at any given instant is related to such factors as the voltage value of the battery source 3, the frequency and power level of the rf signal received by the amplifier 7, and the ambient temperature, and serves either to increase or decrease the conduction in the transistor Q in accordance with these factors thereby to control the values of the voltage V and the value of the load current $I_L$ drawn by the amplifier 7.

By way of a specific example, if the voltage of the battery source 3 is at or near its maximum value (fully charged value of 11 volts), and/or the rf frequency and/or power level of the signal received by the amplifier 7 are at high values, the amount of current drawn by the amplifier 7 will tend to be large, and the amplifier 7 delivers an rf output power of large value. As the values of the above factors decline, the voltage across the resistance R1 is compared to the voltage at the non-inverting input of the operational amplifier OA, and the difference voltage is amplified by the operational amplifier, causing its output voltage to increase. This increased output voltage of the operational amplifier OA establishes the current flow through the transistor Q at the desired level of 45 mA. The voltage at the collector of the transistor Q is thus controlled to allow a maximum current of 45 mA to be drawn by the amplifier 7. In a similar manner as discussed hereinabove, if the voltage of the battery source 3 is at or near its minimum value (8 volts), and/or the rf frequency and/or power level of the signal received by the amplifier 7 are at low levels, the amount of current drawn by the amplifier 7 will tend to be lower than 45 mA. The voltage at the emitter of the transistor Q will be higher than in the above example, and the output of the operational amplifier OA will be low. The base voltage of the transistor Q will be low compared to the emitter and the maximum possible current will be drawn through the transistor Q to the amplifier 7. This maximum current flow will permit the greatest possible rf output power under these conditions. The current drawn in this particular instance will ordinarily be below the 45 mA maximum established by the control circuit 2. In the above examples, ambient temperature changes within the aforementioned range of $-30°$ C. to $+72°$ C. and accompanying the other types of conditions will, by virtue of the resistances R3 and R4 causing variations in the output voltage of the amplifier OA, be compensated for in a fashion so as to reduce the battery drain, especially at low temperatures which normally degrade battery performance.

The control circuit 2 as described hereinabove is particularly useful in situations in which it is possible for the amplifier 7 to look into a load which acts like a short circuit. Such a load condition might occur, for example, in the case of damage to the antenna 12 which establishes a high VSWR condition. In the absence of the current-limiting action provided by the control circuit 2, such a high VSWR condition could cause damage to the amplifier 7, for example, by overheating and destroying solid state components in the amplifier 7 (by virtue of excessive current flow), and also cause the battery source 3 to run down. By virtue of the current-limiting action provided by the control circuit 2, the transmitter 1 is not completely shut down and some form of radiation, albeit inefficient, will generally be possible.

The transmitter 1 as described hereinabove is intended for FM operation. If desired, AM operation can be readily achieved by utilizing amplitude modulated signals rather than frequency modulated signals and by connecting a capacitance, such as shown in dotted outline at C in FIG. 2, between the battery source 3 and the non-inverting input of the operational amplifier OA. The capacitance C, which may have a value of 1–2 microfarads, serves to remove the AM component of the current $I_L$ and maintain the transmitter current at an average level.

Figure 3:
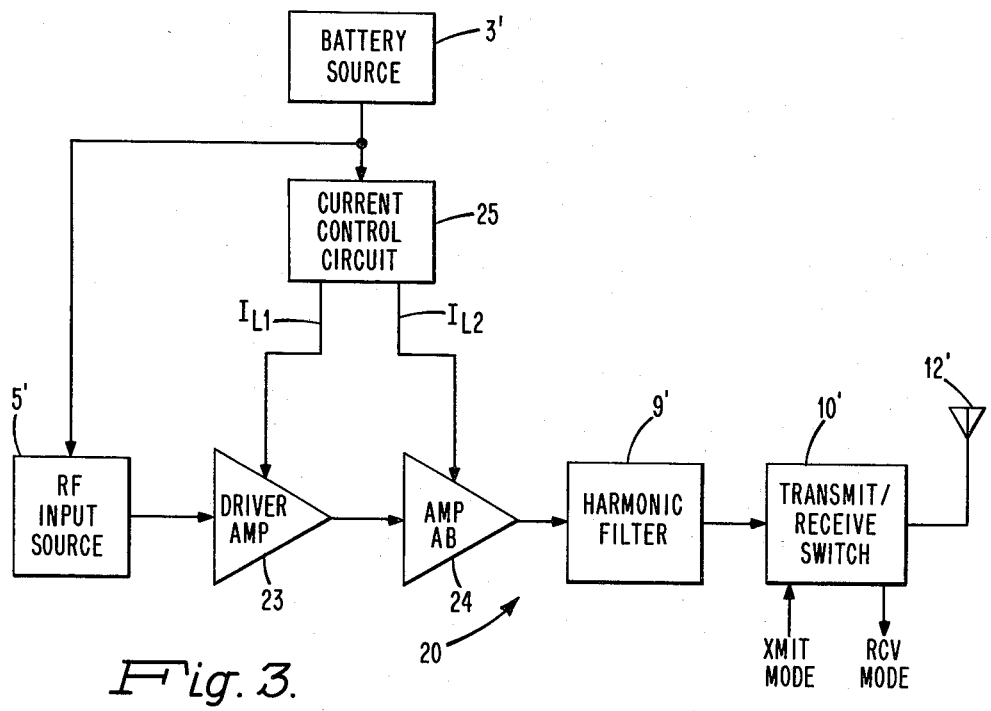
FIG. 3 is a schematic block diagram of a transmitter including a current control circuit in accordance with an alternative embodiment of the invention.
Figure 4:
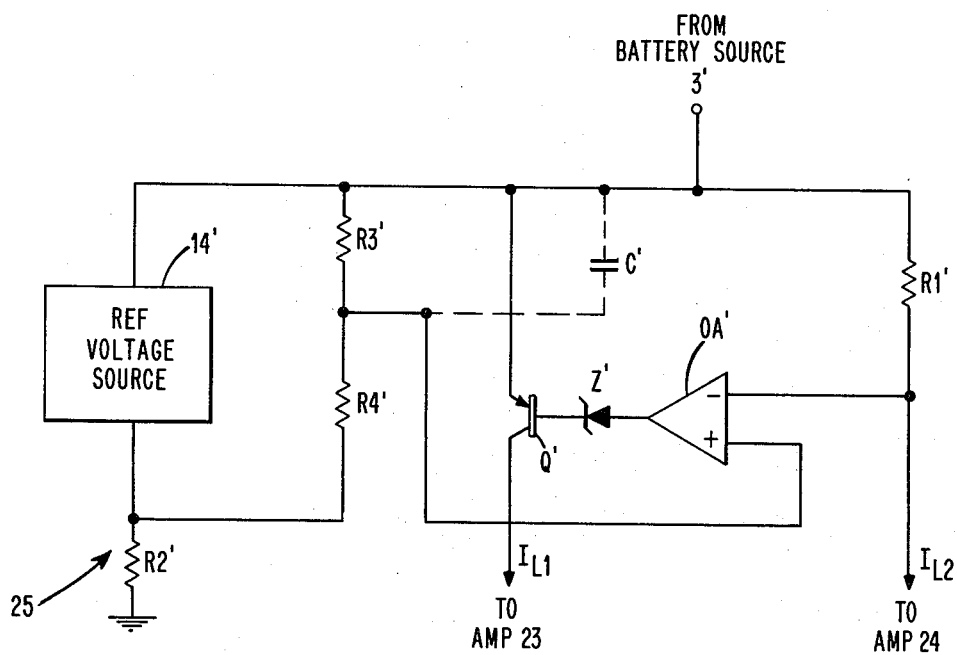
FIG. 4 is a schematic circuit diagram of the current control circuit employed in the transmitter of FIG. 3.

Referring now to FIG. 3, there is shown an FM transmitter 20 including a current control circuit 25 in accordance with an alternative embodiment of the invention. The transmitter 20 is similar to the earlier described transmitter 1 but employs a pair of series-connected amplifiers 23 and 24 in lieu of the single amplifier 7 and has a control circuit 25 of slightly different configuration than the earlier described control circuit 2. The components of the transmitter 20 and the control circuit 25 which are like those of the transmitter 1 and the control circuit 2 are shown with primed references in FIGS. 3 and 4.

The transmitter 20 of FIG. 3 offers advantages over the transmitter 1 of FIG. 1 in that the control circuit 25 provides separate control for the amplifiers 23 and 24 via separate current paths $I_{L1}$ and $I_{L2}$ from the control circuit 25, resulting in an increased amount of voltage being supplied to the amplifier 24. Further, because the amplifier 23, which is a driver amplifier, has a lower operating current than the amplifier 24, there is a reduced power loss in the control circuit 25. The control circuit 25 is shown in detail in FIG. 4. As can be seen from FIG. 4, the various components of the control circuit 25 are interconnected in the same general manner as the components of the earlier described control circuit 2 with the exception that the transistor Q' is connected in series with the driver amplifier 23 so that load current $I_{L1}$ can be drawn by the amplifier 23 via the transistor Q', and the current-sensing resistance R1' is connected in series with the amplifier 24 so that load current $I_{L2}$ can be drawn by the amplifier 24 via the resistance R1'. Because the amplifier 24 is connected directly to the resistance R1 (and not through a transistor/resistance combination as in FIG. 2), a greater amount of voltage can be supplied to the amplifier 24. Further, because the transistor Q' is in series with the driver amplifier 23, which has a lower operating current than the amplifier 24 as previously mentioned, there is a reduced power loss in the control circuit 25. Beyond the above differences, the control circuit 25 operates in essentially the same manner as the earlier described control circuit 2.

While there has been described what are considered to be preferred embodiments of the invention, it will be readily apparent to those skilled in the art that various changes and modifications may be made therein without departing from the invention as called for in the appended claims.

What is claimed is:

1. A transmitter powered by a dc voltage of a battery source and arranged to amplify a rf signal over a range of variations in the value of the voltage of the battery source, said transmitter comprising:
   amplifier means arranged to receive said rf signal and having a control input;
   control circuit means coupled to the battery source and to the control input of the amplifier means and powered by the battery source;
   said control circuit means being operative to produce a control voltage at the control input of the amplifier means and said amplifier means being operative in response to said control voltage to draw load current from the control circuit means having a value related to the value of the control voltage and to amplify the rf signal received thereby in accordance with the value of the control voltage;
   said control circuit means comprising:
      sensing circuit means operative to sense the value of load current drawn by the amplifier means and to produce a voltage related thereto; and
      control means operative to compare the voltage produced by the sensing circuit means with a voltage varying with variations in the voltage of the battery source and to produce a control voltage related to the difference at the control input of the amplifier means, said control voltage having a value such that the load current drawn by the amplifier means does not exceed a specified maximum value, thereby conserving the battery source.

2. A transmitter in accordance with claim 1 wherein the control means comprises:
   comparator means coupled to the sensing circuit means and having a first input for receiving the voltage produced by the sensing circuit means and further having a second input;
   reference means coupled to the battery source and to the second input of the comparator means and operative to provide to the second input of the comparator means a voltage having a value equal to the value of the voltage of the battery source less a specified value of voltage;
   said comparator means being operative to compare the voltages at its first and second inputs and to produce an output voltage having a value related to the difference between the values of the compared voltages; and
   output means coupled to the comparator means for receiving the output voltage produced by the comparator means and operative in response to said output voltage to produce a control voltage at the control input of the amplifier means.

3. A transmitter in accordance with claim 2 wherein the reference means comprises:
   reference source means operative to produce a fixed value of voltage; and
   means coupled to the reference source means and to the second input of the comparator means and operative to control the value of the voltage at the second input of the comparator means so as to limit to a specified maximum value the load current drawn by the amplifier means through the output means.

4. A transmitter in accordance with claim 3 wherein: the last mentioned means includes a pair of resistances coupled across the reference source means and having the juncture thereof coupled to the second input of the comparator means.

5. A transmitter in accordance with claim 4 wherein: the output means includes a transistor.

6. A transmitter in accordance with claim 5 wherein the sensing circuit means comprises:
   a resistance coupled in a series path with the transistor and the battery source.

7. A transmitter in accordance with claim 6 wherein: the pair connected across resistances of the reference source means have specified temperature coefficients selected to vary the voltage at the second input of the comparator means in accordance with variations in ambient temperature whereby the value of the output voltage of the comparator means and also the value of the control voltage of the transistor vary in a direction to compensate for variations in ambient temperature.

8. A transistor in accordance with claim 7 wherein: the comparator means includes an operational amplifier.

9. A transmitter in accordance with claim 8 wherein: the amplifier means includes a Class AB amplifier.

10. A transmitter powered by a dc voltage of a battery source and arranged to amplify a rf signal over a range of variations in the frequency and/or power level of the rf signal and over a range of variations in the value of the voltage of the battery source, said transmitter comprising:
    rf input source means powered by the battery source and operative to produce a rf signal of a predetermined frequency;
    amplifier means arranged to receive said rf signal and having a control input;
    control circuit means coupled to the battery source and to the control input of the amplifier means and powered by the battery source, said control circuit means being operative to produce a control voltage at the control input of the amplifier means having a value related to the frequency and power level of the rf signal and to the value of voltage of the battery source and further operative to produce a related load current limited to a predetermined maximum value, and said amplifier means being operative in response to said control voltage to amplify the rf signal in accordance with the value of the control voltage and to draw load current from the control circuit means having a value related to the value of the control voltage but not to exceed the predetermined maximum value;

said control circuit means comprising:

sensing circuit means operative to sense the value of load current drawn by the amplifier means and to produce a voltage related thereto; and control means operative to compare the voltage produced by the sensing circuit means with a voltage varying with variations in the voltage of the battery source and to produce a control voltage related to the difference at the control input of the amplifier means, said control voltage having a value such that the load current drawn by the amplifier means does not exceed the specified maximum value, thereby conserving the battery source.

11. A transmitter in accordance with claim 10 wherein the control means comprises:

comparator means coupled to the sensing circuit means and having a first input for receiving the voltage produced by the sensing circuit means and further having a second input;

reference means coupled to the battery source and to the second input of the comparator means and operative to provide to the second input of the comparator means a voltage having a value equal to the value of the voltage of the battery source less a specified value of voltage;

said comparator means being operative to compare the voltages at its first and second inputs and to produce an output voltage having a value related to the difference between the values of the compared voltages; and output means coupled to the comparator means for receiving the output voltage produced by the comparator means and operative in response to said output voltage to produce a control voltage at the control input of the amplifier means.

12. A transmitter in accordance with claim 11 wherein:

the output means includes a transistor;

the sensing circuit means comprises a resistance in a series path with the transistor of the output means and the battery source; and the control means comprises:

reference source means operative to produce a fixed value of voltage; and means coupled to the reference source means and to the second input of the comparator means and operative to control the value of the voltage at the second input of the comparator means so as to limit to a specified maximum value the value of the load current drawn by the amplifier means through the transistor.

13. A transmitter in accordance with claim 12 wherein:

the last mentioned means includes a pair of resistances coupled across the reference source means and having the juncture thereof coupled to the second input of the comparator means, said resistances having specified temperature coefficients selected to vary the voltage at the second input of the comparator means in accordance with variations in ambient temperature whereby the value of the output voltage of the comparator means and also the value of the control voltage of the transistor vary in a direction to compensate for variations in ambient temperature.

14. A transmitter in accordance with claim 13 wherein:

the comparator means includes an operational amplifier.

* * * * *